US010033856B1

(12) United States Patent
Ligeret et al.

(10) Patent No.: US 10,033,856 B1
(45) Date of Patent: Jul. 24, 2018

(54) DETERMINING QUALITY OF PROVIDING NETWORK SERVICES BY A WIRELESS COMMUNICATION NETWORK (71) Applicant: T-Mobile USA, Inc., Bellevue, WA (US)

(72) Inventors: Xavier Ligeret, Seattle, WA (US); Hui-Hsia Sung, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/203,612

(22) Filed: Jul. 6, 2016

Related U.S. Application Data

(60) Provisional application No. 62/189,403, filed on Jul. 7, 2015.

(51) Int. Cl.
 *H04M 3/22* (2006.01)
 *H04M 15/00* (2006.01)
 *H04W 24/08* (2009.01)
 *H04W 60/00* (2009.01)

(52) U.S. Cl.
 CPC ......... *H04M 3/2227* (2013.01); *H04M 15/58* (2013.01); *H04W 24/08* (2013.01); *H04W 60/005* (2013.01); *H04M 2215/32* (2013.01)

(58) Field of Classification Search
 CPC ....... H04W 60/00; H04W 60/02; H04W 8/06; H04W 24/02; H04W 24/04; H04W 24/08; H04W 24/10; H04W 8/18
 See application file for complete search history.

(56) References Cited

U.S. PATENT DOCUMENTS

| 6,119,012 A * | 9/2000 | Amirijoo | H04W 60/02 455/453 |
| 9,026,110 B1* | 5/2015 | Nehme Antoun | H04W 60/04 455/435.1 |
| 9,615,242 B2* | 4/2017 | Ligeret | H04W 8/18 |
| 2004/0057378 A1 | 3/2004 | Gronberg | |
| 2009/0203326 A1 | 8/2009 | Vesma et al. | |
| 2011/0273986 A1* | 11/2011 | Le Rouzic | H04W 60/02 370/235 |
| 2012/0077473 A1* | 3/2012 | Suzuki | G06Q 30/0205 455/414.1 |

(Continued)

OTHER PUBLICATIONS

Office Action for U.S. Appl. No. 15/458,313, dated Oct. 18, 2017, Ligeret et al., "Determining a Service Leakage Rate Within a Wireless Communication Network", 8 pages.

*Primary Examiner* — George Eng
*Assistant Examiner* — Umair Ahsan
(74) *Attorney, Agent, or Firm* — Lee & Hayes, PLLC (57) ABSTRACT

A method of determining health or quality of providing network services by a wireless communication network and retaining subscribers on the wireless network by a wireless communication network that uses counters within an application server. A number of users at a first point in time is determined by the counters. A number of initial registrations and a number of refresh registrations is also determined by the counters. Based upon the counting, an initial registration rate and a refresh registration rate is determined for a time interval. The initial registration rate and the refresh registration rate are evaluated to determine the health of providing network services by the wireless communication network.

21 Claims, 4 Drawing Sheets

(56) References Cited

U.S. PATENT DOCUMENTS

| | | | |
|---|---|---|---|
| 2013/0090132 A1* | 4/2013 | Terada | H04W 4/021 |
| | | | 455/456.1 |
| 2013/0143563 A1* | 6/2013 | Singh | H04W 68/02 |
| | | | 455/436 |
| 2015/0006259 A1 | 1/2015 | Yoo et al. | |
| 2015/0126236 A1 | 5/2015 | Mukherjee et al. | |
| 2016/0084875 A1 | 3/2016 | Aoki | |
| 2016/0337495 A1 | 11/2016 | Akita | |
| 2017/0013439 A1* | 1/2017 | Ligeret | H04W 24/08 |
| 2017/0188225 A1 | 6/2017 | Ligeret et al. | |

* cited by examiner

DETERMINING QUALITY OF PROVIDING NETWORK SERVICES BY A WIRELESS COMMUNICATION NETWORK

CROSS-REFERENCE TO RELATED APPLICATION

The present disclosure is related to and claims priority from U.S. Provisional Patent Application No. 62/189,403, filed Jul. 7, 2015, which is incorporated herein by reference.

BACKGROUND

In recent years, telecommunication devices have advanced from offering simple voice calling services within wireless networks to providing users with many new features. Telecommunication devices now provide messaging services such as email, text messaging, and instant messaging; data services such as Internet browsing; media services such as storing and playing a library of favorite songs; location services; and many others. In addition to the new features provided by the telecommunication devices, users of such telecommunication devices have greatly increased. Such an increase in users is only expected to continue and in fact, it is expected that there could be a growth rate of twenty times more users in the next few years alone. Such an increase in wireless traffic implies more demand and less radio resource availability, which likely leads to the degradation of the wireless network performance.

Operators of wireless networks generally use success rate key performance indicators (KPIs) to measure the performance in their wireless networks. However, such KPIs are generally only based on the ratio of "the number of successful responses to attempts requests" divided by "the number of attempts." Thus, current KPIs do not fully capture other factors, such as, for example, initial registration and refresh registrations, that reflect the "health" or quality of the wireless network related to providing services and retaining subscribers on the wireless network once the subscribers have initially registered with the network for receiving services from the wireless network.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein is a wireless communication network that includes techniques and architecture for determining the "health" or quality of providing network services by the wireless communication network and retaining subscribers on the wireless communication network. For example, an application server, either located within the wireless communication network or separately therefrom, includes counters that count the number of users that initially attempt to access the wireless communication network. The counters also count the number of users that refresh their registration on the wireless communication network. Additionally, the counters also count the number of users or subscribers on the wireless communication network.

In an embodiment, at a first point in time, the number of users on the wireless communication network is determined using the counters. Additionally, the number of user initial registration attempts for accessing the wireless communication network is determined for a time interval between the first point in time and a second point in time using the counters. Also, the number of user registration refresh attempts on the wireless communication network is determined for the time interval between the first point in time and the second point in time using the counters. The measurement time interval, in embodiments, is generally equal to, or slightly higher than, a refresh rate of a refresh timer utilized in the wireless communication network for requiring refresh registrations of mobile devices on the wireless communication network. In embodiments, the refresh timer is generally set to one hour; however, it can be set higher or lower if desired.

The number of user initial registration attempts is divided by the number of users on the wireless communication network at the first point in time to provide an initial registration rate. Additionally, the number of user refresh registration attempts is also divided by the number of users on the wireless communication network at the first point in time to provide a refresh registration rate. Thus, an initial registration rate and a refresh registration rate are determined for the wireless communication network over the time interval. As will be discussed herein, the initial registration rate and the refresh registration rate represent network quality scores or key performance indicators (KPIs) for the wireless communication network.

In general, users register their mobile devices initially on the wireless communication network for services and do not voluntary exit or unregister their mobile devices from the wireless communication network. For example, if a user registers to receive voice over Long Term Evolution (VoLTE) services with a wireless communication device, then the user generally will wish to remain on the wireless communication network for making and receiving phone calls. Hence, the user's mobile device will periodically refresh registration with the wireless communication network. However, if for some reason, the user's mobile device is dropped or unregistered from the wireless communication network, then the user will do an initial registration to the wireless communication network a second time. Accordingly, it can be assumed that during main parts of the day, i.e., when most people are awake, mobile devices will register once initially with the wireless communication network and then refresh registration periodically. Thus, it can be assumed that during peak times, initial registration of mobile devices is due to mobile devices being dropped or unregistered from the wireless communication network involuntarily.

As previously noted, the initial registration rate and the refresh registration rate represent network quality scores or KPIs for the wireless communication network. If the initial registration rate is low and the refresh registration rate is high, then the health or quality of the network services provided by the wireless communication network is very good since mobile devices are refreshing registration and not needing to initially register again because of being dropped. If both rates are low, then the health is generally considered to be very bad due to no registrations. Also, if both rates are high, then the health of the network 10 is generally considered to be bad to very bad due to the high number of InitReg_rate showing that the network is causing more registrations due to the network 10 dropping subscribers or being unable to process new registrations for example. Likewise, if the initial registration rate is high but the refresh rate registration rate is low, then the quality of the services provided by the wireless communication network is considered to be bad or very bad because it is assumed that mobile devices are being dropped repeatedly and needing to initially register over and over.

In embodiments, the initial registration rate and the refresh registration rate are measured for two consecutive time intervals. In an embodiment, one measurement is at the busiest hour of the day and the other is after the busiest hour of the day. Generally, the busiest hour of the day is considered the hour of the day with the highest count of registered subscribers. In embodiments, the busiest day of the week is utilized for determining the initial registration rate and the refresh registration rate of the wireless communication network. However, in accordance with various embodiments, the initial registration rate and the refresh registration rate may be determined multiple days of the week or even every day of the week if desired. Likewise, the initial registration rate and the refresh registration rate may be determined multiple times during a day if desired. The measurement time interval, in embodiments, is equal to, or slightly higher than, the refresh timer utilized in the wireless communication network for requiring refresh registrations of mobile devices on the wireless communication network. In embodiments, the refresh timer is generally set to one hour; however, it can be set higher or lower if desired.

In embodiments, instead of a refresh registration rate, an average refresh registration rate is determined, which may help to smooth the data. For example, a time interval may be between T1 and T2. A refresh registration rate may be determined between T1 and T2 based upon the subscriber count at T1. A second time interval may be between T2 and T3. A refresh registration rate may be determined between T2 and T3 based upon the subscriber count at T2. The two refresh rates are determined, added and then divided by two to provide the average refresh registration rate. However, if desired, more time intervals may be used for determining an average refresh registration rate.

Figure 1:
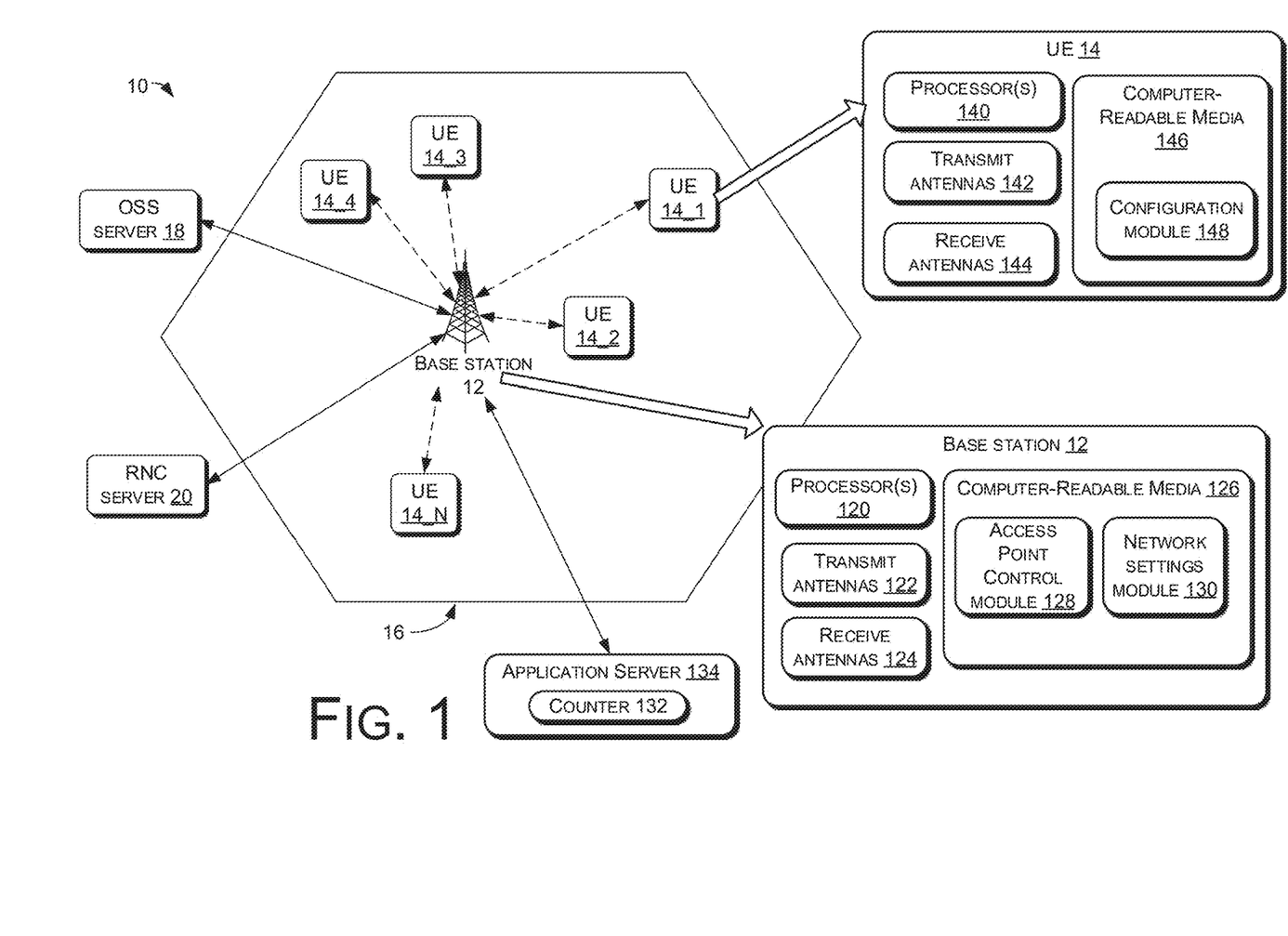
FIG. 1 illustrates a wireless communication network, in accordance with various embodiments.

FIG. 1 illustrates a wireless communication network 10 (also referred to herein as network 10). The network 10 comprises a base station (BS) 12 communicatively coupled to a plurality of user devices, referred to as UEs 14_1, 14_2, ..., 14_N, where N is an appropriate integer. The BS 12 serves UEs 14 located within a geographical area, e.g., within a macro cell 16. FIG. 1 illustrates the macro cell 16 to be hexagonal in shape, although other shapes of the macro cell 16 may also be possible. In general, the network 10 comprises a plurality of macro cells 16, with each macro cell 16 including one or more BSs 12.

In an embodiment, the UEs 14_1, ..., 14_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, integrated devices combining one or more of the preceding devices, and/or the like. As such, UEs 14_1, ..., 14_N may range widely in terms of capabilities and features. For example, one of the UEs 14_1, ..., 14_N may have a numeric keypad, a capability to display only a few lines of text and be configured to interoperate with only Global System for Mobile Communications (GSM) networks. However, another of the UEs 14_1, ..., 14_N (e.g., a smart phone) may have a touch-sensitive screen, a stylus, an embedded GPS receiver, and a relatively high-resolution display, and be configured to interoperate with multiple types of networks. UEs 14_1, ..., 14_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 12 may communicate voice traffic and/or data traffic with one or more of the UEs 14_1, ..., 14_N. The BS 12 may communicate with the UEs 14_1, ..., 14_N using one or more appropriate wireless communication protocols or standards. For example, the BS 12 may communicate with the UEs 14_1, ..., 14_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 12 may be communicatively coupled (e.g., using a backhaul connection, illustrated using solid lines in FIG. 1) to a number of backhaul equipments, e.g., an operation support subsystem (OSS) server 18, a radio network controller (RNC) 20, and/or the like. The RNC 20 can also be in the form of a mobility management entity when the wireless communication network 10 operates according to the long term evolution (LTE) standard or LTE Advanced standard.

In an embodiment, the base station 12 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 12 can also be in the form of a Node B (where the wireless communication network 10 is 3G UMTS network) or in the form of an eNode B (where the wireless communication network 10 operates according to the LTE standard or LTE Advanced standard).

The one or more transmit antennas 122 may transmit signals to the UEs 14_1, ..., 14_N, and the one or more receive antennas 124 may receive signals from the UEs 14_1, ..., 14_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 12.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 12. The computer-readable media 126 may reside within the base station 12, on one or more storage devices accessible on a local network to the base station 12, on cloud storage accessible via a wide area network to the base station 12, or in any other accessible location.

The computer-readable media 126 may store modules, such as instructions, data stores, and so forth that are configured to execute on the processors 120. For instance, the computer-readable media 126 may store an access point control module 128 and a network settings module 130, as will be discussed in more detail herein later.

Although FIG. 1 illustrates the computer-readable media 126 in the BS 12 storing the access point control module 128 and the network settings module 130, in various other embodiments, the access point control module 128, the network settings module 130, and one or more other modules (not illustrated, may be stored in another component of the network 10 (e.g., other than the BS 12). For example, one or more of these modules may be stored in a computer-readable media included in the OSS server 18, the RNC 20, another appropriate server associated with the network 10, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 12 may comprise several other components, e.g., a power bus configured to supply power to various components of the base station 12, one or more interfaces to communicate with various backhaul equipment, and/or the like.

In an embodiment, the UEs 14 may comprise processors 140, one or more transmit antennas (transmitters) 142, one or more receive antennas (receivers) 144, and computer-readable media 146. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 12, and the one or more receive antennas 144 may receive signals from the base station 12. In an embodiment, the antennas 142 and 144 may be included in a transceiver module of the UE 14.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14.

The computer-readable media 146 may store several modules, such as instructions, data stores, and so forth that are configured to execute on the processors 140. For instance, the computer-readable media 140 may store a configuration module 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 12, other UEs, etc.).

Although not illustrated in FIG. 1, the UEs 14 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 14_1) in detail, each of the UEs 14_2, ..., 14_N may have a structure that is at least in part similar to that of the UE 14_1. For example, similar to the UE 14_1, each of the UEs 14_2, ..., 14_N may comprise processors, one or more transmit antennas, one or more receive antennas, and computer-readable media including a configuration module.

In an embodiment, the network settings module 130 stored in the computer-readable media 126 maintains a plurality of network settings associated with the network 10. Individual network settings maintained by the network settings module 130 may be pertinent to a single UE of the UEs 14_1, ..., 14_N, a subset of the UEs 14_1, ..., 14_N, or each of the UEs 14_1, ..., 14_N. For example, a network setting of the plurality of network settings may specify a maximum bit rate at which a UE (or each of the UEs 14_1, ..., 14_N) may transmit data to the BS 12. Another network setting of the plurality of network settings may specify a transmit time interval (tti) used by each of the UEs 14_1, ..., 14_N to transmit data to the BS 12. Yet another network setting of the plurality of network settings may specify a maximum power that each of the UEs 14_1, ..., 14_N may use to transmit data to the BS 12. The plurality of network settings maintained by the network settings module 130 may also include any other appropriate type of network settings.

In an embodiment, one or more of the plurality of network settings maintained by the network settings module 13 may be communicated to the UEs 14_1, ..., 14_N (e.g., by the transmit antennas 122 to the receive antennas 144 of the UEs 14_1, ..., 14_N). Based on receiving the network settings, the UEs 14_1, ..., 14_N (e.g., the corresponding configuration modules 148) may configure themselves and communicate with the BS 12 accordingly.

Generally, the network 10 is made up of multiple macro cells 16. Thus, depending on the configuration and size, the network 10 can represent and serve various regional areas, e.g., a city, a state, an entire nation, the whole world, etc.

In embodiments, a counter 132 is located within an application server (AS) 134. In an embodiment, the application server 134 is a telephony application server (TAS). The application server 134 may be located within the network 10 at various locations. In embodiments, the application server 134 may be located within the OSS server 18 or the RNC 20. The network 10 may include multiple application servers 134, and therefore multiple counters 132. Furthermore, each application server 134 may include more than one counter 132 to help keep track of various parameters. The application server(s) 134 may be located outside the network 10.

The UEs 14 generally access or connect to the network 10 by a registration process. Likewise, the UEs 14 exit the network 10 by a de-registration process. However, sometimes the UEs 14 are involuntarily disconnected or dropped from the network 10. In order to monitor the quality and health of the network 10 in providing network services, an initial registration rate and a refresh registration rate are determined, where the initial registration rate represents the rate at which UEs 14 initially register with the network 10 and where the refresh registration rate represents the rate at which UEs 14 refresh their registration with the network 10. As is known, once a UE 14 initially registers with the network 10, the UE 14 periodically refreshes its registration with the network 10 to maintain its registration with the network 10. In embodiments, the timing of refreshing registration is once an hour, although other amounts of time may be used if desired.

In accordance with an embodiment, an initial registration rate formula is represented by Eq. 1:

$$InitReg\_Rate = InitReg\_Attempts/Sub\_count\_T1 \quad \text{Eq. 1}$$

In accordance with the embodiment, a refresh registration rate formula is represented by Eq. 2:

$$ReReg\_Rate = ReReg\_Attempts/Sub\_count\_T1 \quad \text{Eq. 2}$$

Sub_count_T1 is the registered subscriber count measured at a first time T1. InitReg_Attempts is the (cumulated) number of initial registrations with the network 10 counted between T1 and a second point in time, T2. ReReg_Attempts is the (cumulated) number of refreshed registrations counted between T1 and T2. As previously noted, initial registrations distinguish from "refresh" registrations. For example, in an IMS network the users who are already registered on the IMS network send "refresh register" on a regular basis (time interval is dictated by the network and an example is one hour), similarly to a "keep alive" procedure, whereas the "initial register" is the procedure to connect the users (who are not already registered on the IMS network) to the IMS network.

Thus, in an embodiment, at a first point in time T1, the number of UEs 14 on the network 10 (Sub_count_T1) is determined using one or more of the counters 132. At a second point in time T2, the number of UEs 14 on the network 10 (Sub_count_T2) is again determined using one or more of the counters 132. During the time period between T1 and T2, one or more of the counters 132 also determine the number of UEs 14 that initially accessed the network 10 by initially registering (InitReg_Attempts) and the number of UEs 14 that refreshed registration with the network 10 (ReReg_Attempts).

Thus, using Eq. 1, in order to determine the initial registration rate (InitReg_Rate), the InitReg_Attempts is divided by the Sub_count_T1. Using Eq. 2, in order to determine the refresh registration rate (ReReg_Rate), the ReReg_Attempts is divided by the Sub_count_T1. As will be discussed further herein, the initial registration rate and the refresh registration rate represent network quality scores or KPIs for the network 10.

In general, users register their UEs 14 initially on the network 10 for various services and do not voluntary exit or de-register their UEs 14 from the network 10. For example, if a user registers a UE 14 to receive Voice over Long Term Evolution (VoLTE) services over the network 10 with the UE 14, then the user generally will wish for the UE 14 to remain on the network 10 for making and receiving phone calls. Hence, the user's UE 14 will periodically refresh registration with the network 10 to remain on the network 10. However, if for some reason, the UE 14 is dropped or de-registered from the network 10, then the user will perform a subsequent initial registration on the network 10 a second (or more) time. Accordingly, it can be assumed that during primary parts of the day, i.e., when most people are awake, UEs 14 will register once initially with the network 10 and then refresh registration periodically in accordance with the network's protocols. Thus, it can be assumed that during peak times, initial registration of UEs 14 is due to UEs 14 being dropped or de-registered from the network 10 involuntarily.

Figure 2:
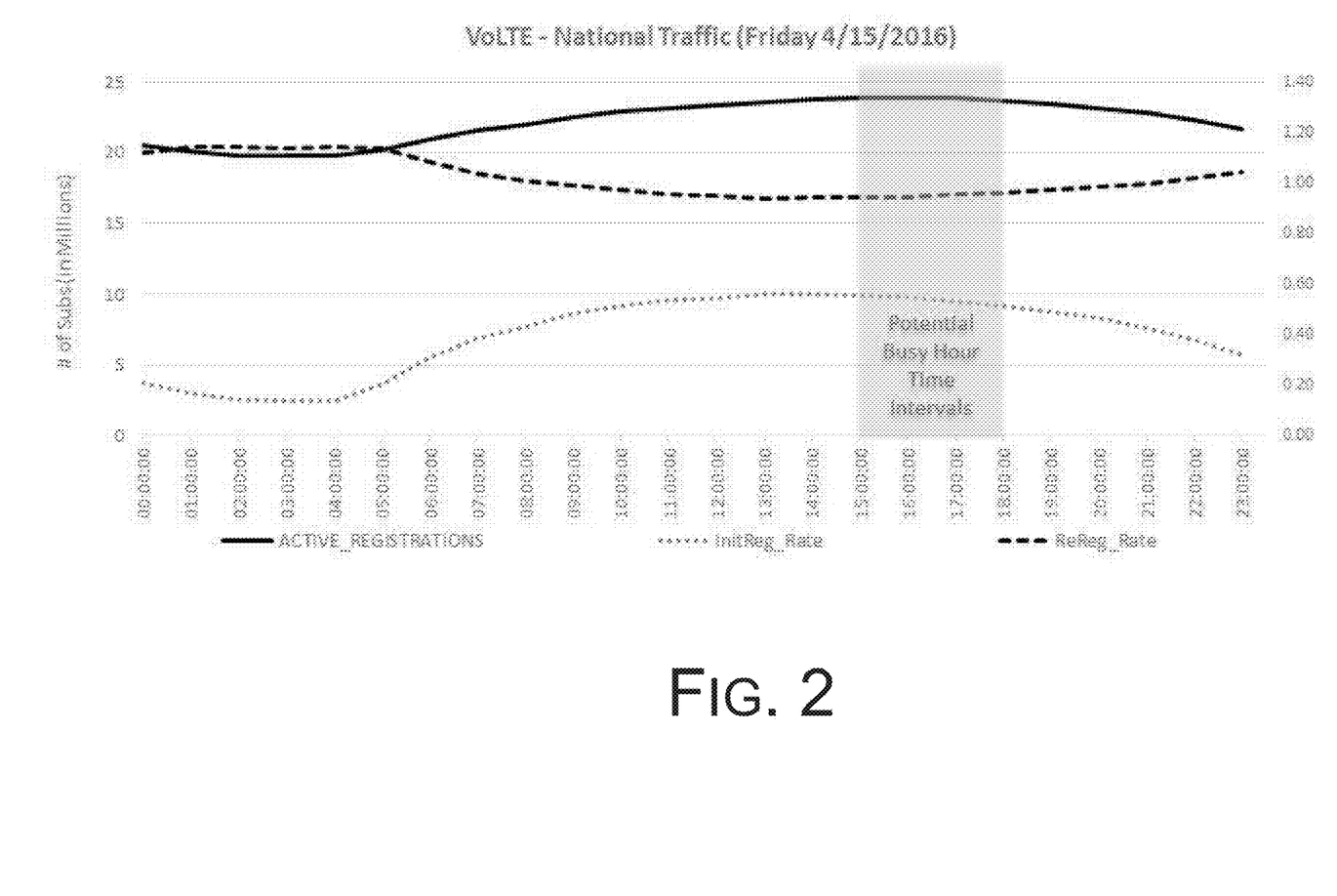
FIG. 2 graphically illustrates an example of a day of traffic of subscribers on the wireless communication network of FIG. 1.

As previously noted, the initial registration rate and the refresh registration rate represent network quality scores or KPIs for the network 10. Referring to FIG. 2, an example of a day of traffic of subscribers (UEs 14) on the network 10 is graphically illustrated. As can be seen, in the early hours of the day, active registrations of subscribers and the ReReg_Rate are nearly at a 1:1 ratio and InitReg_Rate is low, thus indicating that few subscribers are being dropped. However as the time of day increases and traffic increases, the ReReg_Rate decreases and the InitReg_Rate increases, thereby signaling that more subscribers are being dropped or de-registered from the network 10 involuntarily. As previously noted, in embodiments, the InitReg_Rate and ReReg_Rate are evaluated during two time intervals and during the busiest time intervals on the busiest day of the week. As can be seen in the example of FIG. 2, the busiest time intervals (most active registrations) are between 3:00 and 4:00 pm and 4:00 and 5:00 pm. Also, generally Fridays are the busiest day of the week for traffic on the network 10. However, any time intervals and number of time intervals may be evaluated and any day or days of the week may be evaluated.

Figure 3:
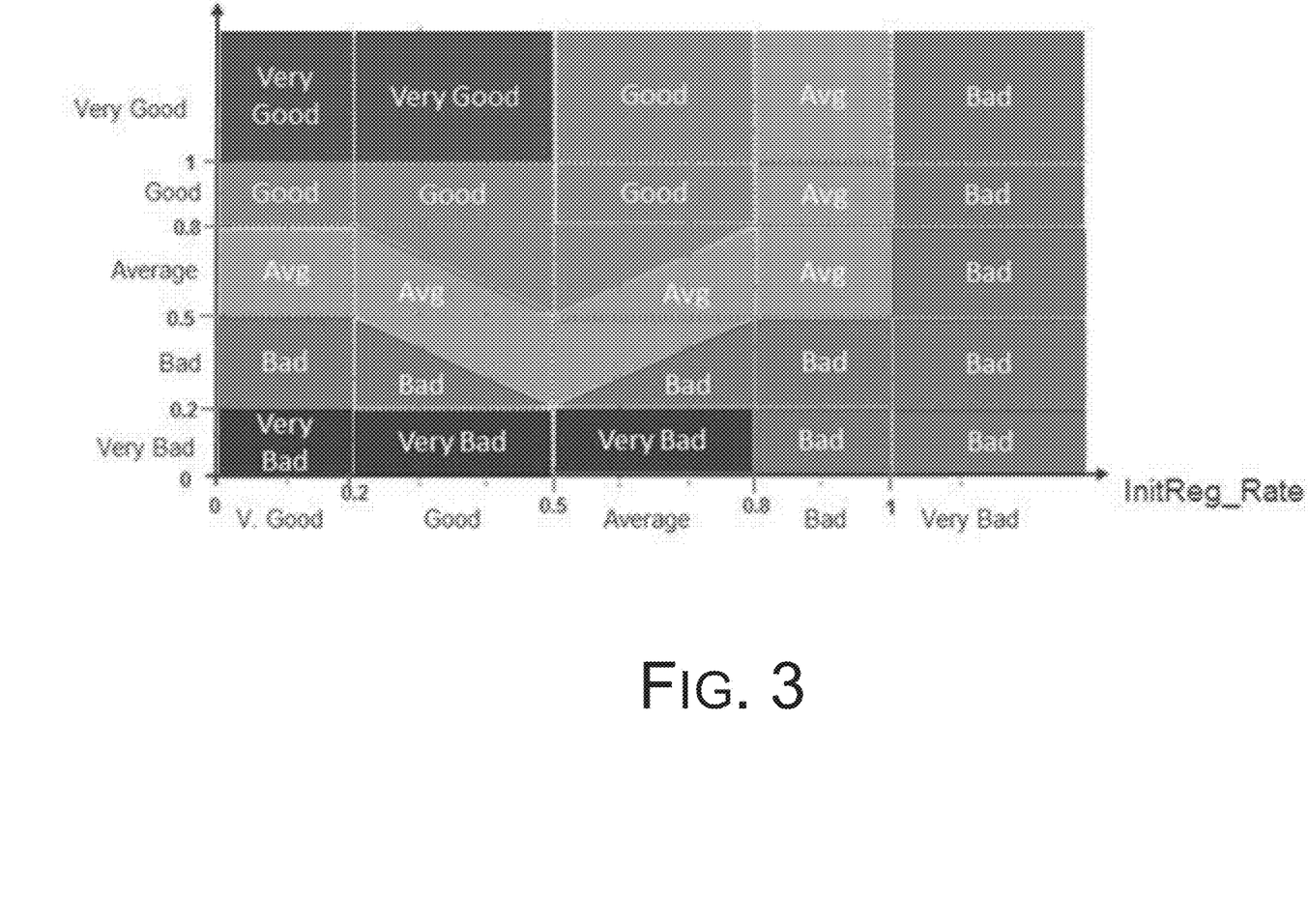
FIG. 3 graphically illustrates relationships of an initial registration rate and a refresh registration rate with respect to the health of the wireless communication network of FIG. 1.

As previously noted, it is assumed that once a user initially registers a UE 14 on the network 10, the user desires to leave the UE 14 registered on the network 10 for the day and the UE 14 will refresh registration periodically. Thus, referring to FIG. 3, the InitReg_Rate and the ReReg_Rate may be evaluated and compared together to determine the health of providing services and retaining subscribers (UEs 14) by the network 10. If the InitReg_Rate is low and the ReReg_Rate is high, then the health or quality of the services provided by the network 10 is very good since UEs 14 are refreshing registration and not needing to initially register again because of being involuntarily dropped or de-registered, i.e. ReReg_Rate is close to a 1 to 1 ratio with respect to the number of UEs 14 actively registered on the network 10. If both rates are low, then the health of the network 10 is generally considered to be bad to very bad due to no registrations. Also, if both rates are high, then the health of the network 10 is generally considered to be bad to very bad due to the high number of InitReg_rate showing that the network is causing more registrations due to the network 10 dropping subscribers or being unable to process new registrations for example. Likewise, if the InitReg_Rate is high but the ReReg_Rate is low, then the quality of the services provided by the network 10 is considered to be bad to very bad because it is assumed that UEs 14 are being dropped repeatedly and needing to initially register over and over. As can be seen in FIG. 3, if the InitReg_Rate is low to approximately medium and the ReReg_Rate is medium to approximately high medium, then the health of the network is generally average.

In embodiments, as previously noted, the InitReg_Rate and the ReReg_Rate are measured for two consecutive time intervals, generally two consecutive hours. In an embodiment, one measurement is at the busiest hour of the day and the other is after the busiest hour of the day. Generally, the busiest hour of the day is considered the hour of the day with the highest count of registered subscribers (UEs 14) on the network 10. In embodiments, the busiest day of the week for registered subscribers (UEs 14) on the network 10 is utilized for determining the InitReg_Rate and the ReReg_Rate of the network 10. However, in accordance with various embodiments, the InitReg_Rate and the ReReg_Rate may be determined multiple days of the week or even every day of the week. Likewise, the InitReg_Rate and the ReReg_Rate may be determined multiple times during a day if desired and only one time interval or more than two time intervals if desired. The measurement time interval, in embodiments, is equal to, or slightly higher than, a refresh rate of the refresh timer utilized in the network 10 for requiring refresh registrations of UEs 14 on the network 10. In embodiments, the refresh timer is generally set to one hour; however, it can be set higher or lower if desired.

In embodiments, instead of a ReReg_Rate, an average ReReg_Rate is determined, which may help to smooth the data. For example, a time interval may be between T1 and T2. A ReReg_Rate may be determined between T1 and T2 based upon a Sub_count_T1 (Sub_count_T1). A second time interval may be between T2 and T3. A ReReg_Rate may be determined between T2 and T3 based upon the subscriber count at T2 (Sub_count_T2). The two ReReg_Rates are determined, added and then divided by two to provide the average ReReg_Rate for the two time intervals. However, if desired, more time intervals may be used for determining an average refresh registration rate. The average ReReg_Rate is then evaluated in conjunction with the determined InitReg_Rate as described above.

The evaluation of InitReg_Rates and ReReg_Rates can be used with the various wireless communication network protocols or standards previously mentioned above. More particularly, the evaluation of InitReg_Rates and ReReg_Rates can be used for services that are based on an IMS network, such as, for example, voice-over LTE (VoLTE), video-over LTE (ViLTE), Wi-Fi calling, voice-over Wi-Fi (VoWiFi), rich communication services (RCS) and web RTC. Use of counters, InitReg_Rates and ReReg_Rates as described herein provides real time network health status, which can be adopted to allow more agile resource network assignment as necessary. Additionally, the InitReg_Rates and ReReg_Rates requires very low processing and calculation costs. Also, the evaluation of InitReg_Rates and ReReg_Rates allows for finer statistical granularity. For example, in embodiments, the InitReg_Rates and ReReg_Rates can be calculated hourly, every 30 minutes, every 20 minutes, every 15 minutes, every 10 minutes, etc., in order to provide even more accuracy. In other words, the smaller time interval between calculation of the rate, the more accurate the InitReg_Rates and ReReg_Rates information is.

Figure 4:
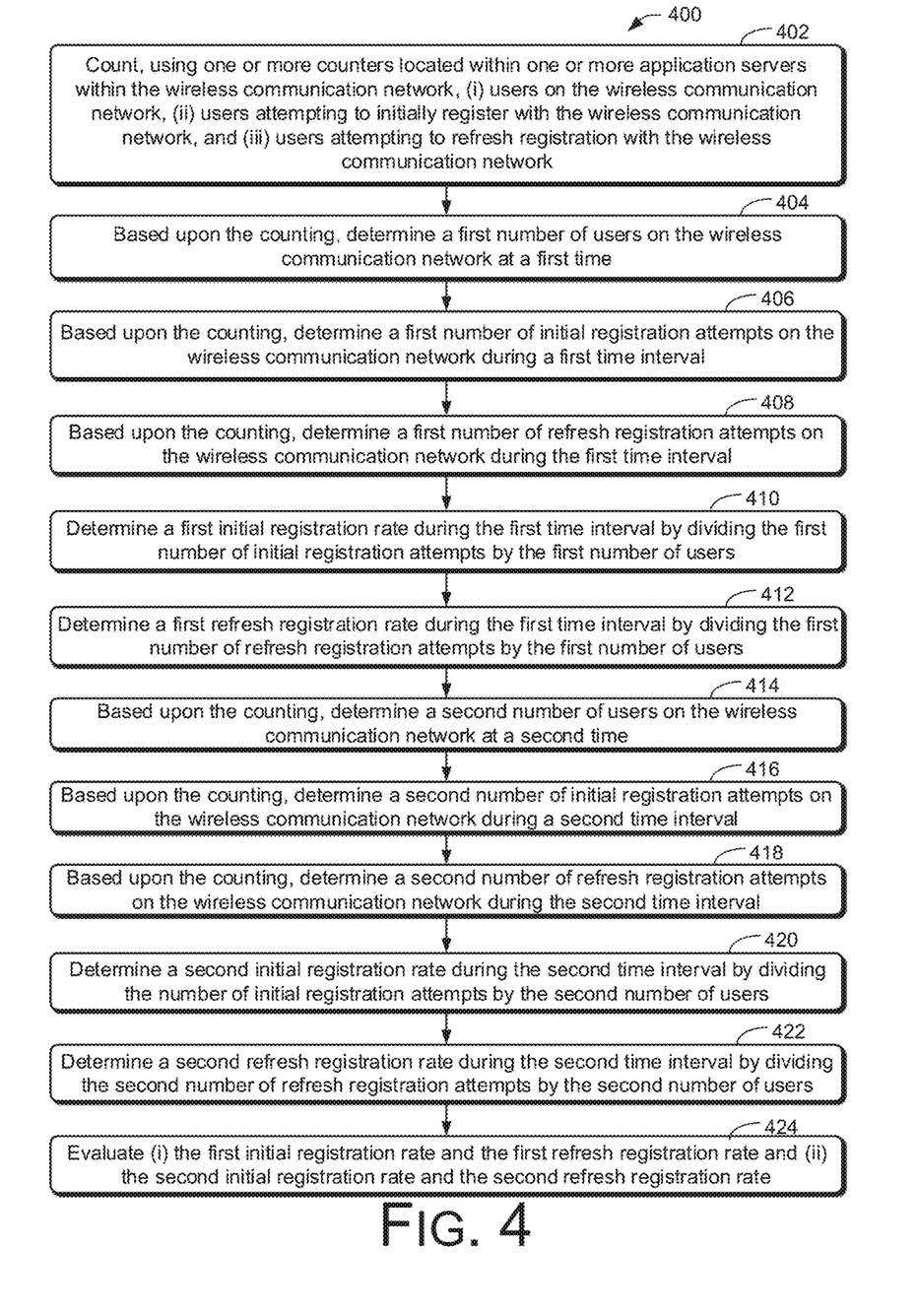
FIG. 4 is a flowchart illustrating a method of determining quality of providing network services by the wireless communication network of FIG. 1, in accordance with various embodiments.

FIG. 4 is a flow diagram of an illustrative process that may be implemented within the wireless communication network 10. This process (as well as other processes described throughout) are illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processors and processing cores in other environments and computing devices.

FIG. 4 is a flowchart illustrating a method 400 of determining quality of providing network services by a wireless communication network, e.g., the wireless communication network 10. As illustrated, at block 402, one or more counters located within one or more application servers within the wireless communication network, count (i) users on the wireless communication network, (ii) users attempting to initially register with the wireless communication network, and (iii) users attempting to refresh registration with the wireless communication network. At block 404, based upon the counting, a first number of users on the wireless communication network at a first time is determined. At block 406, based upon the counting, a first number of initial registration attempts on the wireless communication network during a first time interval is determined. At block 408, based upon the counting, a first number of refresh registration attempts on the wireless communication network during the first time interval is determined. At block 410, a first initial registration rate during the first time interval is determined by dividing the first number of initial registration attempts by the first number of users. At block 412, a first refresh registration rate during the first time interval is determined by dividing the first number of refresh registration attempts by the first number of users. At block 414, based upon the counting, a second number of users on the wireless communication network at a second time is determined. At block 416, based upon the counting, a second number of initial registration attempts on the wireless communication network during a second time interval is determined. At block 418, based upon the counting, a second number of refresh registration attempts on the wireless communication network during the second time interval is determined. At block 420, a second initial registration rate during the second time interval is determined by dividing the number of initial registration attempts by the second number of users. At block 422, a second refresh registration rate during the second time interval is determined by dividing the second number of refresh registration attempts by the second number of users. At block 424, (i) the first initial registration rate and the first refresh registration rate are evaluated and (ii) the second initial registration rate and the second refresh registration rate are evaluated.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method of determining quality of providing network services by a wireless communication network including a resource network assignment, the wireless communication network providing services to registered users, the services including initial registration of users to generate registered users and refresh registration of registered users, the method comprising:
- counting, using one or more counters located within one or more application servers, (i) users on the wireless communication network, (ii) users attempting to initially register with the wireless communication network, and (iii) users attempting to refresh registration with the wireless communication network;
- based upon the counting, determining a first number of users on the wireless communication network at a first time;
- based upon the counting, determining a first number of initial registration attempts by registered users on the wireless communication network during a first time interval, the first time interval beginning at the first time;
- based upon the counting, determining a first number of refresh registration attempts by registered users on the wireless communication network during the first time interval;
- determining a first initial registration rate during the first time interval by dividing the first number of initial registration attempts by the first number of users;
- determining a first refresh registration rate during the first time interval by dividing the first number of refresh registration attempts by the first number of users;
- based upon the counting, determining a second number of users on the wireless communication network at a second time;
- based upon the counting, determining a second number of initial registration attempts by registered users on the wireless communication network during a second time interval, the second time interval beginning at the second time;
- based upon the counting, determining a second number of refresh registration attempts by registered users on the wireless communication network during the second time interval;
- determining a second initial registration rate during the second time interval by dividing the second number of initial registration attempts by the second number of users;
- determining a second refresh registration rate during the second time interval by dividing the second number of refresh registration attempts by the second number of users;
- evaluating (i) the first initial registration rate and the first refresh registration rate and (ii) the second initial registration rate and the second refresh registration rate to determine a network health status, the network health status representing a quality of the wireless communication network related to providing services to registered users; and
- based, at least in part on the network health status, modifying the resource network assignment to enhance an ability of the wireless communication network to provide services to registered users.

2. The method of claim 1, wherein the first time interval and the second time interval are consecutive time intervals.

3. The method of claim 1, wherein the first time interval and the second time interval are at least equal to a refresh rate for requiring refresh registrations of users within the wireless communication network.

4. The method of claim 1, wherein the one or more application servers are located within the wireless communication network.

5. The method of claim 1, wherein the one or more application servers are located outside the wireless communication network.

6. The method of claim 1, wherein the first refresh registration rate and the second refresh registration rate are averaged together to provide an average refresh registration rate and the first initial registration rate is compared with the average refresh registration rate and the second initial registration rate is compared with the average refresh registration rate.

7. The method of claim 1, wherein the wireless communication network comprises one of (i) a long term evolution (LTE) network, (ii) an advanced LTE network, (iii) a global system for mobile communications (GSM) network, (iv) an internet protocol multimedia subsystem (IMS) network, (v) a Universal Mobile Telecommunications System (UMTS) network, or (vi) a Wi-Fi Calling network, (vii) Voice over Long Term Evolution (VoLTE), or (viii) Voice over Wi-Fi (VoWiFi).

8. An apparatus comprising:
- a non-transitory storage medium; and
- instructions stored in the non-transitory storage medium, the instructions being executable by the apparatus to
  - count (i) users on a wireless communication network, (ii) users attempting to initially register with the wireless communication network, and (iii) users attempting to refresh registration with the wireless communication network, the wireless communication network including a resource network assignment and providing services to registered users, the services including initial registration of users to generate registered users and refresh registration of registered users,
  - based upon the count of users on the wireless communication network, determine a first number of users on the wireless communication network at a first time,
  - based upon the count of users attempting to initially register with the wireless communication network, determine a first number of initial registration attempts by registered users on the wireless communication network during a first time interval, the first time interval beginning at the first time,
  - based upon the count of users attempting to refresh registration with the wireless communication network, determine a first number of refresh registration attempts by registered users on the wireless communication network during the first time interval,
  - determine a first initial registration rate during the first time interval by dividing the first number of initial registration attempts by the first number of users,
  - determine a first refresh registration rate during the first time interval by dividing the first number of refresh registration attempts by the first number of users,
  - evaluate the first initial registration rate and the first refresh registration rate to determine a first network health status, the first network health status representing a quality of the wireless communication network related to providing services to registered users, and based, at least in part on the first network health status, modify the resource network assignment to enhance an ability of the wireless communication network to provide services to registered users.

9. The apparatus of claim 8, wherein the instructions are further executable by the apparatus to:

based upon the count of users on the wireless communication network, determine a second number of users on the wireless communication network at a second time;

based upon the count of users attempting to initially register with the wireless communication network, determine a second number of initial registration attempts by registered users on the wireless communication network during a second time interval, the second time interval beginning at the second time;

based upon the count of users attempting to refresh registration with the wireless communication network, determine a second number of refresh registration attempts on the wireless communication network during the second time interval;

determine a second initial registration rate during the second time interval by dividing the second number of initial registration attempts by the second number of users;

determine a second refresh registration rate during the second time interval by dividing the second number of refresh registration attempts by the second number of users to determine a second network health status;

evaluate the second initial registration rate and the second refresh registration rate; and based in part on at least one of the first network health status or the second network health status, modify the resource network assignment.

10. The apparatus of claim 9, wherein the first time interval and the second time interval are consecutive time intervals.

11. The apparatus of claim 8, wherein the first time interval is at least equal to a refresh rate for requiring refresh registrations of users within the wireless communication network.

12. The apparatus of claim 8, wherein the apparatus comprises an application server located within the wireless communication network.

13. The apparatus of claim 8, wherein the apparatus comprises an application server located outside the wireless communication network.

14. The apparatus of claim 8, wherein the wireless communication network comprises one of (i) a long term evolution (LTE) network, (ii) an advanced LTE network, (iii) a global system for mobile communications (GSM) network, (iv) internet protocol multimedia subsystem (IMS) network, (v) a Universal Mobile Telecommunications System (UMTS) network, (vi) a Wi-Fi Calling network, (vii) Voice over Long Term Evolution (VoLTE), or (viii) Voice over Wi-Fi (VoWiFi).

15. A wireless communication network comprising an apparatus comprising a non-transitory storage medium and instructions stored in the non-transitory storage medium including a resource network assignment, the wireless communication network providing services to registered users, the services including initial registration of users to generate registered users and refresh registration of registered users, the instructions being executable by the apparatus to:

count (i) users on a wireless communication network, (ii) users attempting to initially register with the wireless communication network, and (iii) users attempting to refresh registration with the wireless communication network, based upon the count of users on the wireless communication network, determine a first number of users on the wireless communication network at a first time, based upon the count of users attempting to initially register with the wireless communication network, determine a first number of initial registration attempts by registered users on the wireless communication network during a first time interval, the first time interval beginning at the first time, based upon the count of users attempting to refresh registration with the wireless communication network, determine a first number of refresh registration attempts by registered users on the wireless communication network during the first time interval, determine a first initial registration rate during the first time interval by dividing the first number of initial registration attempts by the first number of users, determine a first refresh registration rate during the first time interval by dividing the first number of refresh registration attempts by the first number of users, evaluate the first initial registration rate and the first refresh registration rate to determine a first network health status, the first network health status representing a quality of the wireless communication network related to providing services to registered users, and based, in part on the first network health status, modify the resource network assignment to enhance an ability of the wireless communication network to provide services to registered users.

16. The wireless communication network of claim 15, wherein the instructions are further executable by the apparatus to:

based upon the count of users on the wireless communication network, determine a second number of users on the wireless communication network at a second time;

based upon the count of users attempting to initially register with the wireless communication network, determine a second number of initial registration attempts by registered users on the wireless communication network during a second time interval, the second time interval beginning at the second time;

based upon the count of users attempting to refresh registration with the wireless communication network, determine a second number of refresh registration attempts by registered users on the wireless communication network during the second time interval;

determine a second initial registration rate during the second time interval by dividing the second number of initial registration attempts by the second number of users;

determine a second refresh registration rate during the second time interval by dividing the second number of refresh registration attempts by the second number of users;

evaluate the second initial registration rate and the second refresh registration rate to determine a second network health status; and based, in part on at least one of the first network health status or the second network health status, modify the resource network assignment.

17. The wireless communication network of claim 16, wherein the first time interval and the second time interval are consecutive time intervals.

18. The wireless communication network of claim 15, wherein the first time interval is at least equal to a refresh rate for requiring refresh registrations of users within the wireless communication network.

19. The wireless communication network of claim 15, wherein the apparatus comprises an application server located within the wireless communication network.

20. The wireless communication network of claim 15, wherein the apparatus comprises an application server located outside the wireless communication network.

21. The wireless communication network of claim 15, wherein the wireless communication network comprises one of (i) a long term evolution (LTE) network, (ii) an advanced LTE network, (iii) a global system for mobile communications (GSM) network, (iv) internet protocol multimedia subsystem (IMS) network, (v) a Universal Mobile Telecommunications System (UMTS) network, or (vi) a Wi-Fi Calling network, (vii) Voice over Long Term Evolution (VoLTE), or (viii) Voice over Wi-Fi (VoWiFi).

\* \* \* \* \*